Patented July 8, 1941

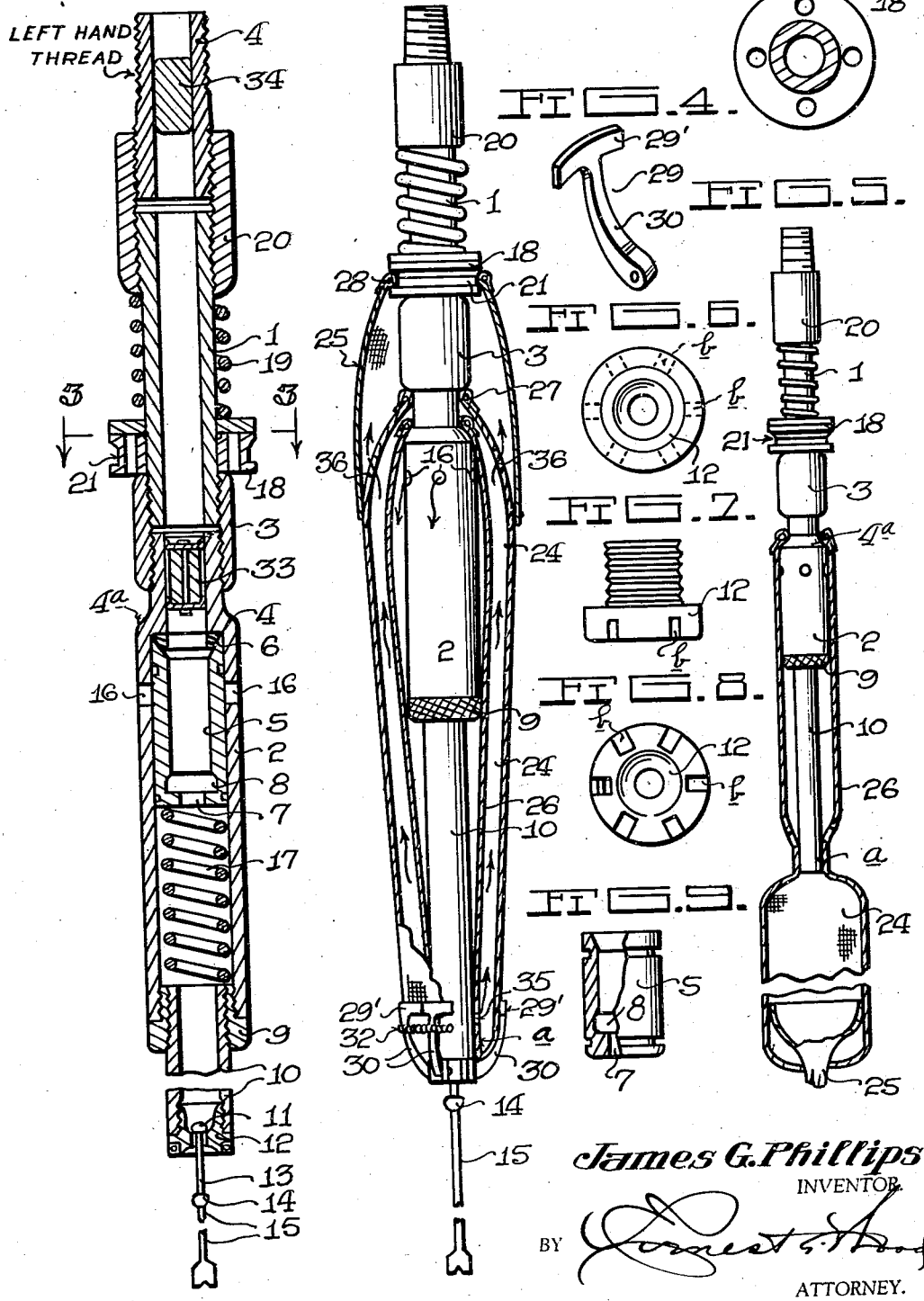

2,248,908

UNITED STATES PATENT OFFICE 2,248,908

SELF-EXPANDING WELL PLUG

James G. Phillips, Wink, Tex., assignor of one-third to V. S. Gary and one-third to Charles P. Laughlin, both of Wink, Tex.

Application August 2, 1940, Serial No. 349,495

6 Claims. (Cl. 166—13)

This invention relates to well plugs and cementing devices and it has particular reference to a device for inexpensively and expeditiously sealing and plugging cavities in a bore hole.

The present application discloses in part subject-matter shown and described in applicant's earlier filed application Serial No. 228,240, filed September 2, 1938, for Plugs for wells and abandoned May 3, 1939.

The principal objects of the invention are: to provide an apparatus which may be positioned at any elevation in a bore hole and adapted to direct and retain a sealing medium at the desired point; to protect the sealing medium against gas and chemical action until a mechanical set and seal is obtained.

Other advantages are apparent, such as effecting a saving of the quantity of sealing medium required; elimination of bulkiness and the like.

With the foregoing objects as paramount, the invention has other and lesser objects, to become apparent as the description proceeds, taken in connection with the accompanying drawing, wherein:

Figure 1 is an elevational view of a tool constructed according to the invention, in vertical section.

Figure 2 is an elevational view of the same tool showing the flexible container for the sealing medium forming the plug.

Figure 3 is a view in transverse section on lines 3—3 on Figure 1.

Figure 4 is a detail view in perspective showing one of a series of container supporting members.

Figure 5 is a view partly in vertical section showing the construction and manner of applying the container to the body of the tool.

Figure 6 is a plan view of the lower valve.

Figure 7 is a side elevation thereof.

Figure 8 is a bottom view of the valve, and

Figure 9 is a side elevational view of the slide valve, partly in section.

The device consists of relatively short pieces of pipe 1 and 2 which are joined together by means of a coupling 3 and adapted to thread into a tubing 4. A sufficient length or number of joints of tubing 4 may be used to lower the member 1 to the desired elevation in a well bore. The upper end of the pipe 2 is preferably provided with a left hand thread, so indicated in Figure 1. Below the threaded portion, the pipe 2 is enlarged diametrically to form an internal shoulder 4ᵃ. A cylindrical member 5 having packing rings 5ᵃ is concentrically arranged in the pipe 2 and adapted to serve as a slide valve. The upper edge of the member 5 is adapted to wedge against a lead washer 6 or a washer of suitable material which will serve as a seal when forced against the shoulder 4ᵃ of the pipe 2. The member 5 is centrally bored the greater portion of the longitudinal length thereof so that its internal diameter is the same as that of the threaded upper portion of the pipe. The base of the member 5 is provided with a small central opening 7. Above and adjacent the opening 7, the member 5 is milled out to form a cavity 8. The base of the pipe 2 is internally threaded and adapted to receive and hold a reducer 9. This reducing member 9 is also internally threaded and adapted to carry a pipe or tubing 10. The lower end of the tubing 10 is threaded and adapted to carry a valve 11 for controlling the flow of a liquid passed through the tubing 4, pipes 1 and 2 and tubing 10.

The valve 11 may be constructed similar to that shown in Figure 1, or of any desirable form that will function when the device is lowered and raised in the well bore. The valve shown in Figure 1 consists of a valve seat 12 which is screwed into the lower end of the tubing 10 and provided with an opening in alignment longitudinally with the tubing 10. A valve stem 13 is passed through the opening of the valve seat 12 and screwed or otherwise attached to the valve 11. The lower end of the stem 13 is provided with a second valve member 14 which is adapted to be moved into contact with the base of the valve seat 12 and close the same. A rod 15 may be attached to the base of the valve member 14, of sufficient length to reach the bottom of the well. The length of the stem 13 permits the valve to be controlled when pressure is directed through the tubing 10 in either direction.

The pipe 2 is provided with a plurality of lateral openings 16 which are adapted to be normally closed by the slide valve or member 5. These openings are positioned slightly below the top of the valve 5, when the valve is wedged against the seal 6, and adapted to register with the container for the sealing medium. In order to hold the slide valve 5 in this position, a spring 17 is interposed between the base of the valve 5 and the member 9. The spring 17 is a coiled spring which is adapted to be carried in the pipe 2 in a manner not to restrict the passage of fluid therethrough.

Surrounding the pipe 1 is a collar 18, provided with a plate 18ᵃ which bears against a coiled spring 19, which in turn, abuts the coupling 20 by which the tool is suspended by the tubing. The collar 18 is annularly grooved at 21 and is welded or otherwise suitably secured to the pipe 1. The purpose of this arrangement will be presently described.

The container for the sealing medium may consist of a flexible or resilient sack 24 which is adapted to fit the outside diameter of the pipe 2 and extend any desired length down the side of the tubing 10, when placed in operative relation with the structure of the device. In form, it is an open-ended cylindrical piece of material having approximately one-half of its length of a diameter slightly greater than the outer diameter of the pipe 2. The other portion of the material may be formed with a diameter sufficient to permit the desired amount of cementing or sealing medium to be directed into the well hole to fill a cavity. The container, before it is placed around the pipe 2 and tubing 10, has the appearance of a long-necked bottle that is provided with a base opening the size of its neck. Within this bottle form and adjacent the base thereof is a conical-shaped, open-ended piece of material which forms a second container 25 for the device (see Figure 5). This conical open-ended member is inverted in the bottle-shaped form and positioned so that its larger rim is secured to the inner walls of the bottle portion.

The neck portion 26 of this bottle-shaped sack or container 23 is adapted to receive, first, the tubing 10 and then the pipe 2. The upper edge of the neck is then secured to the pipe 2, above the shoulder 4ª, and the base of the neck portion 26 is attached to the tubing 10, adjacent the lower end thereof, as at a in Figure 5. Each of these points are made fast with their respective portions of the structure so that they will not be moved during operation of the device. When the neck portion 26 is secured to the structure of the device, the body of the bottle-shaped form is then reversed and directed around the neck portion 26 so that its inner surface will become the outer surface of the container 24. The opening that was originally the base opening in the bottle is moved to a point slightly above the top of the neck portion 26 and secured to the pipe at a point 27, similar to the method of securing the neck portion to the pipe 2. When this is done, the conical member 25 has been moved to the outer portion of the container 24. The free end or the smaller end 28 of the conical member is then resiliently fastened around the collar 18, in the annular groove 21 thereof. This resilient means of attaching the conical portion 25 of the container may consist of a coil spring which encircles the pipe 2 and resiliently anchors the upper portion of the member 25 thereto.

When a sealing medium is forced or directed into the container 24, its weight may tend to cause the portion 26 of the same to be moved on the pipe 2 and the tubing 10. This may be overcome by means of a support for the base of the container 24 which consists of a plurality of flexible members 29 which are disposed on the body of the valve 11. The body of the seat of the valve 11 is slotted at b, as shown in Figures 6, 7, and 8, so as to receive and pivotally support the members 29. Each member 29 is made with an arc-shaped upper member 29′ (Figure 4) which is an integral part of a downwardly extending arm 30. The lower end of the arm 30 is pivotally supported in the slot b of the valve body. These members 29 serve to hold the container 24 in a manner so that the device may be more readily inserted into the well hole, and they serve to support the sack 24 and its sealing medium. The members 29 are normally held against the sack 24 by means of a coil spring 32 which is passed around each prong 29′ and adapted to resiliently urge the same towards the sack. When the sack receives its sealing medium, the members 29 will swing outwardly and rest against the side wall of the well bore or cavity to be sealed and serve as a support for the base of the sack or container 24.

When the device is lowered in a well bore to the desired elevation, a fluid may be poured into the tubing 4 which will pass through the pipes 1 and 2 and slide valve 5, into the tubing 10 and be held therein by the valve 11. When the fluid reaches the desired level in the tubing 2, a plug 33 (Figure 1) is placed in the tubing 4, which serves as a seal between the fluid and the sealing medium. The desired amount of sealing medium is then poured on the top of the plug 33 and the device is moved so as to permit a sufficient escape of the fluid through the valve 11 to permit the sealing medium to pass to the points of outlet 16. A second plug 34 is placed on the top of the sealing medium so that a second supply of water or other liquid may be poured into the tubing 4 to force the sealing medium to the desired destination. These two plugs 33 and 34 serve to seal the sealing medium from contact with fluid or any other element which may be placed in the tubing, prior to and after the sealing medium has been directed into the tubing 4. If the location of the device in the well bore is of sufficient depth to utilize the gravitational force of the sealing medium and the column of liquid placed upon it, the sealing medium may be directed into the container 24 without further power. If the weight of the sealing medium and column of fluid above it is not of sufficient weight to accomplish the desired effect, a pump or ram may be utilized to insure passage of the sealing medium into the container 24. When the lower column of fluid has been permitted to drain through the valve 11, to the extent that the plug 33 engages and moves the slide valve 5 against its spring tension 17 as shown in Figure 1, the ports 16 will be opened and the sealing medium will pass into the container.

When the sealing medium passes through the ports 16, it will pass down between the pipe 2 and the portion 26 of the container 24 until it reaches an opening 35 or a plurality of openings positioned in the lower wall of the portion 26 of the container, before it can pass into the container 24. This insures the direction of the sealing medium into the bottom of the sack or container 24. When the container 24 is filled, the surplus sealing medium may pass through openings 36 which are disposed in the upper portion of the sack 24 and which communicate with the auxiliary sack 25 of the device. Upon completely forcing the sealing medium into the container 24, the plug 34 will rest upon the plug 33 and serve to seal the openings 16 against passage of any foreign substance to the sealing medium while the same is being permitted to set or harden.

It is to be noted that when the flexible container expands with its contents, the plate 18ª moves upward against the spring 19, compressing the same when excess sealing medium is introduced into the container. Holes 22 in the collar permit escape of the excess sealing medium in this manner and these holes, with the plate 18ª, act as a release valve. The spring 19 set at the desired tension regulates the pressure on the container.

Manifestly, the construction as shown and described is capable of some modification and such modification as may be construed within the scope and meaning of the appended claims is also considered to be within the spirit and intent of the invention.

What is claimed is:

1. In combination with a string of tubing in a well, a cementing device comprising a tubular body threadedly suspended by said tubing string, having ports intermediate its ends and a pipe depending therefrom, a valve in said pipe for controlling the passage of fluid therethrough, a slidable valve in said tubular body normally closing said ports, a compressible spring holding said valve in operative position, a double walled, flexible fluid container surrounding said tubular body and pipe, a coniform fabric reinforcing member embracing the upper end of said container and said tubular body, means actuating said slidable valve by fluid pressure to effect passage of fluid through said ports into the space between the inner wall of said container and tubular body, means to constrain said fluid to emerge into the space said inner and the outer wall of said container adjacent the bottom of the latter to expand the same, means to admit excess fluid into said coniform reinforcing member, and means for holding said fluid against reentering said tubular body.

2. In combination with a string of tubing in a well, a cementing plug comprising a tubular body in sections having parts adjacent its upper end and a valve controlled opening in its lower section, a sleeve valve operatively closing said ports, spring means holding said valve in operating position, a dual walled flexible fluid container embracing said tubular body, defining inner and outer chambers, means movable under fluid pressure in said tubing string for actuating said sleeve valve to admit fluid into the inner chamber of said container, means constraining fluid to pass from said inner chamber to said outer chamber at its bottom to thereby rise to the top thereof and expand said container, expansible, fluid receiving reinforcing means embracing the upper end of said container, and means to hold said fluid against passage back into said tubular body from said container.

3. A structure as set forth in claim 2 in which the fluid receiving reinforcing means is in communication with the outer chamber of said container and receives excess fluid forced into said container.

4. In combination with a tubing string in a well, a cementing plug comprising a tubular body in section having a valve controlled fluid passage in its lower end and ports adjacent its upper end, a dual walled, flexible fluid container surrounding said tubular body, defining inner and outer chambers communicating at their lower ends whereby fluid from said tubing string and body will be received first by said inner chamber, thence by said outer chamber at its lower end, spring resisted, means closing the ports in said tubular body prior to its actuation by fluid pressure thereon and means for resisting return of said fluid into said tubular body through said ports when said container has been filled.

5. In combination with a string of tubing in a well, a tubular body having fluid outlet ports and a valve controlled fluid opening in its lower end, an expansible dual walled fluid container surrounding said body receiving fluid through said ports and defining inner and outer chambers in communication at their lower ends and having a fluid receiving reinforcing means embracing the tops thereof and communicating with the outer of said chambers, valve means normally closing the ports in said tubular body, spring means operatively retaining said valve means, means for actuating said valve means for introducing fluid into the chambers and reinforcing means of said container, means to close said ports against return of fluid into said body when said container is filled, and means for supporting the bottom of said container against the weight of fluid therein.

6. A construction as described in claim 5 in which the means for supporting the bottom of the container is comprised of a plurality of arms having their lower ends pivotally joined to the tubular body whereby their upper ends will be capable of radial extension to lie against the expanded bottom of said container.

JAMES G. PHILLIPS.